United States Patent
Stanfield et al.

(10) Patent No.: US 10,376,766 B2
(45) Date of Patent: Aug. 13, 2019

(54) SCOREBOARD AND SYSTEM

(71) Applicant: BLACK & DECKER INC., New Britain, CT (US)

(72) Inventors: Curtis Stanfield, Timonium, MD (US); Steven Phillips, Ellicott City, MD (US); Oleksiy Sergyeyenko, Baldwin, MD (US); Chelsea Wills, Baltimore, MD (US); Shalin Chikhalkar, Towson, MD (US); Timothy W. French, Hampstead, MD (US)

(73) Assignee: Black & Decker Inc., New Britain, CT (US)

( * ) Notice: Subject to any disclaimer, the term of this patent is extended or adjusted under 35 U.S.C. 154(b) by 14 days.

(21) Appl. No.: 15/662,717

(22) Filed: Jul. 28, 2017

(65) Prior Publication Data

US 2018/0028895 A1    Feb. 1, 2018

Related U.S. Application Data

(60) Provisional application No. 62/368,459, filed on Jul. 29, 2016.

(51) Int. Cl.
| | |
|---|---|
| *A63B 71/06* | (2006.01) |
| *A63B 71/02* | (2006.01) |
| *G07C 1/22* | (2006.01) |
| *H01M 2/10* | (2006.01) |

(52) U.S. Cl.
CPC ............ *A63B 71/06* (2013.01); *A63B 71/023* (2013.01); *A63B 71/0669* (2013.01); *G07C 1/22* (2013.01); *H01M 2/1077* (2013.01); *A63B 2071/0625* (2013.01); *A63B 2207/02* (2013.01); *A63B 2220/62* (2013.01); *A63B 2225/50* (2013.01)

(58) Field of Classification Search
CPC .. G08B 5/36; G09G 3/34; A63B 71/06; A63B 71/0669
See application file for complete search history.

(56) References Cited

U.S. PATENT DOCUMENTS

| | | | |
|---|---|---|---|
| 3,638,215 A | 1/1972 | Payne | |
| 3,981,002 A | 9/1976 | Gardner | |
| 4,045,788 A | 8/1977 | Castelli et al. | |
| 4,751,506 A | 6/1988 | Brown | |
| 5,894,261 A | 4/1999 | Green | |
| 6,389,368 B1 | 5/2002 | Hampton | |
| 6,729,413 B2 | 5/2004 | Turner et al. | |
| 6,816,130 B1 | 11/2004 | Shishido et al. | |

(Continued)

FOREIGN PATENT DOCUMENTS

| | | |
|---|---|---|
| DE | 9416174 U1 | 2/1995 |
| JP | 8332255 A2 | 12/1996 |

OTHER PUBLICATIONS

NPL; https://coloradotime.com/manuals/ScoreboardF290ms.pdf, Scoreboard Installation & Service Manual, Colorado Time Systems © 2000.*

*Primary Examiner* — Steven Lim
*Assistant Examiner* — Mancil Littlejohn, Jr.
(74) *Attorney, Agent, or Firm* — Stephen R. Valancius

(57) ABSTRACT

A scoreboard system, the system including a scoreboard. The scoreboard is configured to display at least one score. A battery pack is removably coupled to the scoreboard and selectively powers the scoreboard. The battery pack includes a housing and at least one battery cell housed in the housing.

19 Claims, 13 Drawing Sheets

(56) References Cited

U.S. PATENT DOCUMENTS

| | | | |
|---|---|---|---|
| 6,986,712 B1 | 1/2006 | Ogawa | |
| 7,031,225 B2 * | 4/2006 | McDonald | G04F 8/08 |
| | | | 340/323 R |
| 7,182,150 B2 | 2/2007 | Grossman | |
| 7,554,290 B2 | 6/2009 | Johnson et al. | |
| 7,719,234 B2 | 5/2010 | Carrier et al. | |
| 7,898,393 B2 * | 3/2011 | McMillan | A63B 71/06 |
| | | | 340/323 R |
| 8,093,863 B2 | 1/2012 | Carrier et al. | |
| 8,607,405 B2 * | 12/2013 | Reed | A47L 9/2857 |
| | | | 15/328 |
| 8,731,458 B2 | 5/2014 | Sullivan | |
| 9,956,677 B2 | 5/2018 | Baskar et al. | |
| 2003/0082439 A1 * | 5/2003 | Sakakibara | H01M 2/0202 |
| | | | 429/120 |
| 2008/0254866 A1 | 10/2008 | Young et al. | |
| 2008/0305387 A1 | 12/2008 | Murray et al. | |
| 2011/0032086 A1 * | 2/2011 | Cabrera | A41D 20/00 |
| | | | 340/323 R |
| 2012/0256373 A1 * | 10/2012 | Tam | A63D 15/20 |
| | | | 273/148 R |
| 2014/0100006 A1 * | 4/2014 | Jennings | A63B 71/022 |
| | | | 463/3 |
| 2014/0107853 A1 | 4/2014 | Ashinghurst et al. | |
| 2014/0232326 A1 | 8/2014 | Wohltmann et al. | |
| 2014/0272516 A1 | 9/2014 | Tennison et al. | |
| 2014/0288683 A1 | 9/2014 | Sullivan | |
| 2015/0214519 A1 | 7/2015 | Ringer et al. | |
| 2016/0045811 A1 * | 2/2016 | Klein | A63B 71/0619 |
| | | | 340/323 R |
| 2016/0293909 A1 | 10/2016 | Noreen | |

* cited by examiner

SCOREBOARD AND SYSTEM

CROSS-REFERENCE TO RELATED APPLICATIONS

This application claims the benefit of U.S. Provisional Application No. 62/368,459 filed on Jul. 29, 2016, entitled SCOREBOARD AND SYSTEM. The entire contents of U.S. Provisional Application No. 62/368,459 are incorporated herein by reference.

FIELD OF THE INVENTION

The present invention relates to a scoreboard which displays scores and a scoreboard system.

BACKGROUND

Scoreboards are used for keeping and displaying scores of a sporting event or other contest. It is desirable to provide an improved scoreboard and system.

SUMMARY

According to an aspect of the disclosure, there is an exemplary embodiment of a scoreboard system. The system includes a scoreboard, the scoreboard configured to display at least one score, and a battery pack which is removably coupled to the scoreboard and selectively powers the scoreboard. The battery pack includes a housing and at least one battery cell housed in the housing.

The battery pack may further include a circuit board.

The battery pack may further include a positive terminal, a negative terminal and a temperature terminal.

The positive terminal the negative terminal and the temperature terminal may be operatively connected with the circuit board.

The battery pack may further include a controller. The controller may monitor a temperature and voltage of the battery pack.

The battery pack may further include an ID terminal.

The battery housing may house a plurality of battery cells.

The battery pack may be configured to selectively couple to and provide power to a drill.

The scoreboard may be configured to display at least two scores.

The scoreboard may be configured to display a clock.

According to another aspect, there is an exemplary embodiment including a scoreboard system. The system includes scoreboard, the scoreboard configured to display at least one score and a clock and including a first wireless receiver and a first wireless transmitter. The system further includes a computing device separate from the scoreboard, the computing device including a second wireless transmitter and a second wireless receiver and operable to communicate with the scoreboard through the first wireless receiver and first wireless transmitter. The scoreboard includes user controls on the scoreboard, the user controls configured to control display of the at least one score and the clock.

The computing device may also be operable to control display of the at least one score and the clock.

The scoreboard may also include a controller which determines how the display of the at least one score and the clock is controlled when signals are received from both the computing device and the user controls.

The scoreboard may also include a controller.

The scoreboard may be operable to operate in a mode where inputs from the user controls are ignored.

The scoreboard may include a controller.

The scoreboard may be operable to be operated in a mode where inputs from the computing device are ignored.

The computing device may be a host computing device.

The host computing device may be configured to wirelessly transmit information related to information displayed on the scoreboard to a cloud whereby information displayed on the scoreboard can be retrieved by users of client computing devices.

According to another aspect, there is an exemplary embodiment of a scoreboard system which includes a scoreboard, the scoreboard configured to display at least one score and a clock. The system also includes a battery pack, the battery pack comprising a housing, a plurality of battery cells housed in the housing and a circuit board housed in the housing. The battery pack is a rechargeable battery pack and is removably coupleable to the scoreboard to power the scoreboard and is removably coupleable to a power tool to power the power tool.

The battery pack may further include a positive terminal, a negative terminal and a temperature terminal.

The power tool may be a drill.

According to another aspect, there is an exemplary embodiment of a scoreboard system which includes a dedicated scoreboard. The dedicated scoreboard is configured to display information, the display information including at least one score and a clock and including a first wireless receiver and a first wireless transmitter. A host computing device is separate from the dedicated scoreboard, the host computing device including a second wireless transmitter and a second wireless receiver, the host computing device being wirelessly paired with the scoreboard so that it receives data related to the display information. The system also includes at least one client computing device, the client computing device including a third wireless receiver. The host computing device is configured to wirelessly transmit data related to the display information to a cloud, whereby the display information displayed on the scoreboard can be retrieved by users of the at least one client computing device.

The display information retrieved by the users may include scores.

The display information retrieved by the users may include a timer or clock.

The display information retrieved by the users may include team names.

The client computing devices may be a personal computer, tablet, laptop or smart phone.

The client computing device may include a portable phone.

DESCRIPTION OF EXEMPLARY EMBODIMENTS

Figure 1:
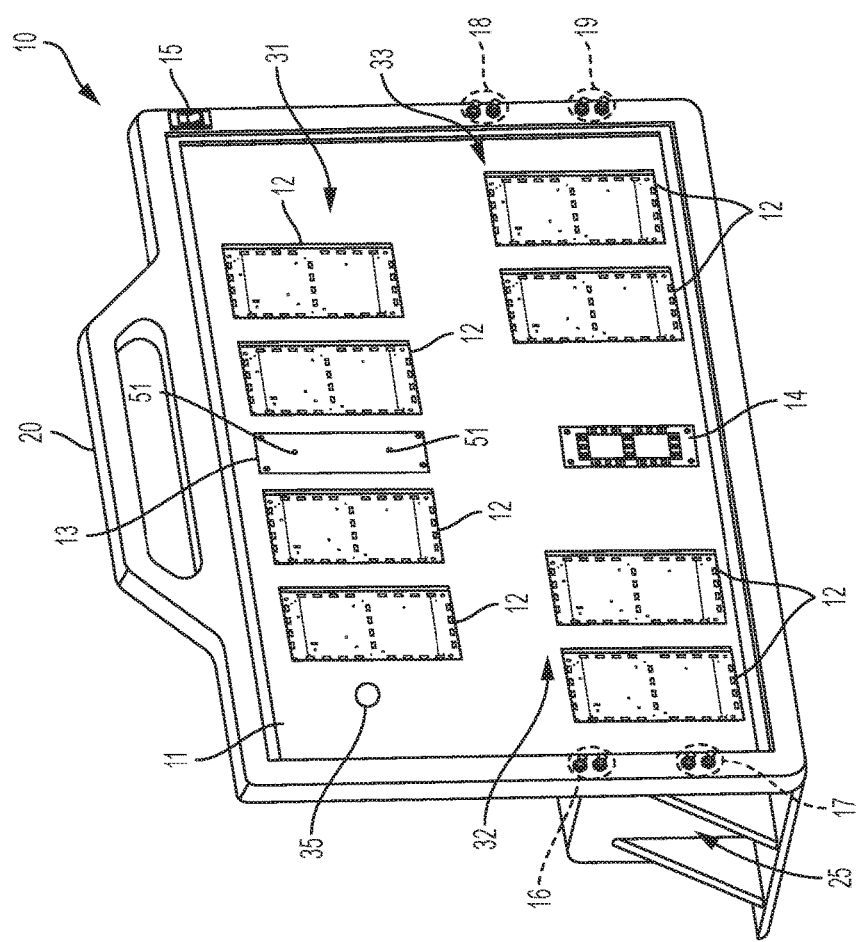
FIG. 1 is a perspective view of an exemplary embodiment of a scoreboard.
Figure 2:
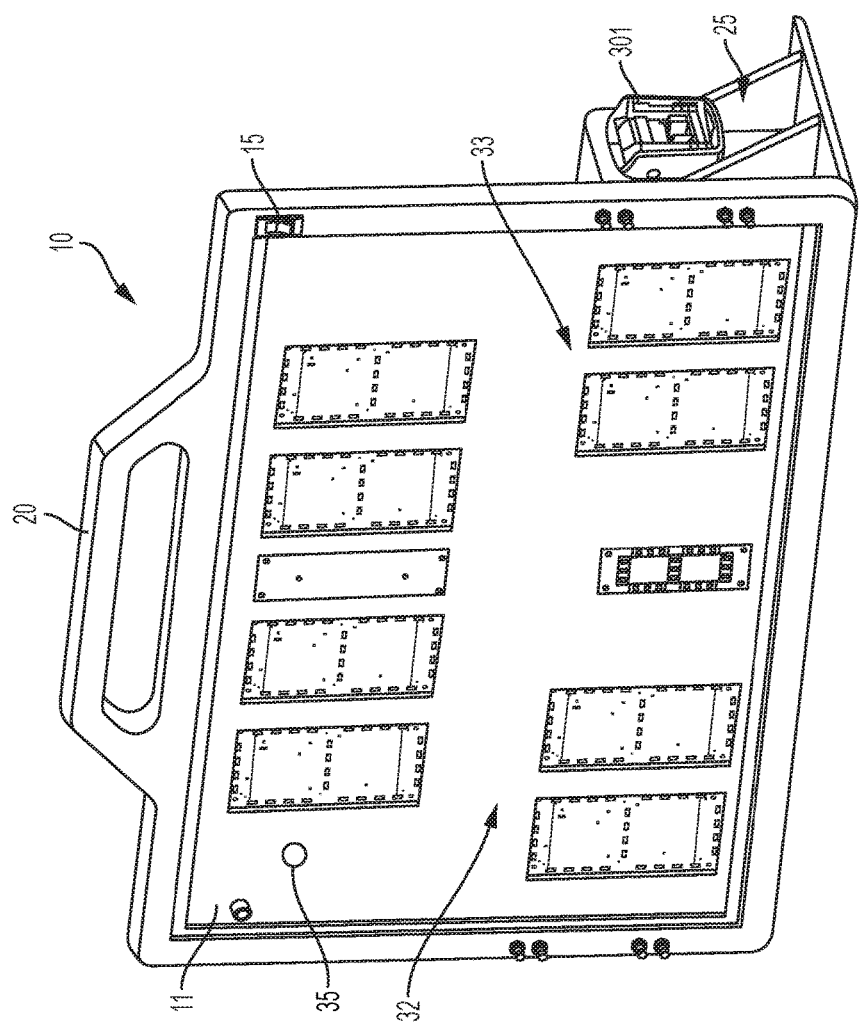
FIG. 2 is another perspective view of an exemplary embodiment of the scoreboard.
Figure 3:
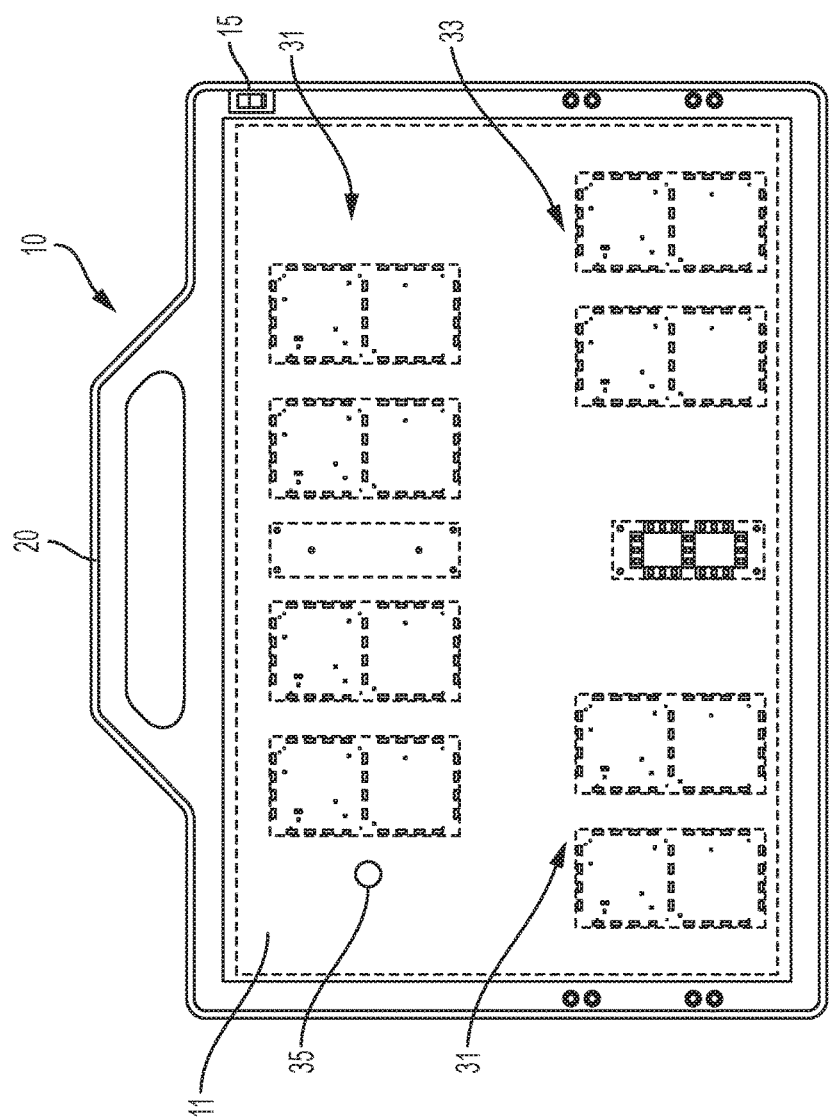
FIG. 3 is a front view of an exemplary embodiment of the scoreboard.

FIGS. 1-3 illustrate the general construction of a scoreboard 10 according to an exemplary embodiment of the present application. The scoreboard includes a front face 11 with a number of LED displays. There are a number of numerical LED displays 12, which are suitable for displaying digits from 0 through 9. The scoreboard 10 also includes a colon display 13 with two LEDs which are suitable for displaying a colon. Also present is a period display member 14 which includes LEDs for displaying digits from 0 through 9 for indicating a period of a game. For example, the period display member 14 may display the quarter for a game such as basketball that has four quarters; the period display member 14 may display the inning for a baseball game; or the period display member 14 may indicate which period it is for a three period hockey game.

The front face 11 may include a glass, plastic or other clear or translucent covering to protect the LEDs. The covering may be frosted, coated with an anti-glare or anti-reflective material or otherwise processed to reduce glare from sunlight or the like.

The upper row 31 includes two pairs of LED displays 12 separated by the colon display 13. The upper row can be utilized for showing a time, such as the time remaining in a game. The two LED displays 12 on the left side of the colon display 13 can display minutes and the two LED displays 12 on the right side of the colon display 13 can display the seconds. For example, the upper row 31 may be set at an initial time of 15 minutes by displaying a one and a five on the left side of the colon display 13 and two zeros on the right side of the colon display 13. The clock can then count down the minutes and seconds to zero and sound a buzzer when the clock reaches zero. An operator may pause, reset or otherwise operate the clock.

The scoreboard of the exemplary embodiment also includes displays for displaying the scores of two teams or competitors. As shown, there is first team display area 32 with a pair of LED displays 12 for displaying the score of a first team and a second team display area 33 with a pair of LED displays 12 for displaying the score of a second team. As will be appreciated, one LED display 12 in each team display area represents the tens-digit and the other LED display 12 represents the ones-digit.

The scoreboard 10 further includes physical controls for controlling the scoreboard. Particularly, the scoreboard 10 includes a switch 15 for turning the scoreboard on and off. Additionally, it includes a number of team display controls 16, 17, 18 and 19. Team display control 16 comprises two buttons. One button is operable to increment the tens-digit LED display 12 in the first team display area 32 and the other button is operable to decrement the tens-digit LED display 12 in the first team display area 32. Team display control 17 also comprises two buttons, one for incrementing the ones-digit LED display 12 in the first team display area 32 and the other button to decrement the ones-digit LED display 12 in the first team display area 32.

Similarly, there is a team display control 17 with buttons for incrementing and decrementing the tens-digit LED display 12 in the second team display area 33 and a team display control 18 with buttons for incrementing and decrementing the ones-digit LED display 12 in the second team display area 33.

The scoreboard 10 may also include a timer control 35. The timer control is a user operable control which allows a user to control upper row 31 by setting the clock created by the LED displays 12 in the upper row 31. As can be appreciated, the tinier control 35 may set the time, start a countdown of the clock or otherwise manipulate the clock shown in the upper row 31. The control 35 may include a dial, push-button or other user operable feature for setting the clock. For competitions that do not use a running clock, such as baseball games, the upper row 31 may display the local time or may be left blank.

Since the scoreboard 10 includes manual controls for setting a timer and scores, the scoreboard 10 of the exemplary embodiment can operate on a stand-alone basis. That is, the scoreboard 10 of the exemplary embodiment can operate without the need for a remote or other control device.

As shown in FIGS. 1 and 2, the scoreboard 10 includes a base 25. The base 20 allows the scoreboard to stand upright when placed on a surface, such as a flat horizontal surface. As shown, the base 25 extends rearwardly from the bottom end of the scoreboard 10.

The scoreboard 10 may be powered by a removable battery pack 300 (described later in further detail). Accordingly, the scoreboard 25 includes a battery pack receptacle 301 on its base 25, as shown in FIG. 2. Additionally, the scoreboard 10 includes a handle 20, which allows a user to easily transport the scoreboard 10.

Figure 4:
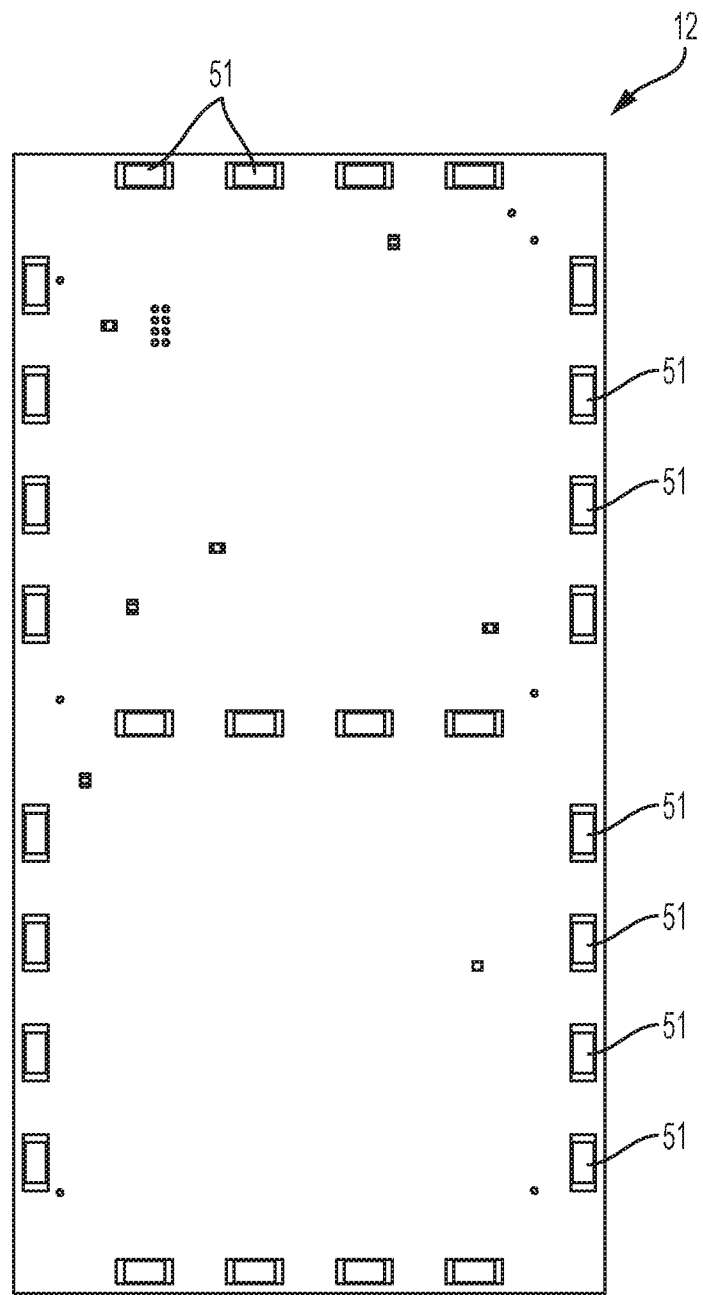
FIG. 4 is a close-up view of an exemplary embodiment of an LED display for the scoreboard.

FIG. 4 is a close-up of one of the LED displays 12 shown in FIGS. 1-3. As shown in FIG. 4, the LED displays 12 include a number of LED elements 51. The LED elements 51 can be selectively illuminated to provide a display, including digits 1-9, as is well known in the art. The LED displays 12 include 28 LED elements 51. The period display member 14 is similar to the LED displays 12, except that it includes 3 LED elements in each segment rather than four. As noted above, the colon display 13 includes two LED elements 51.

Figure 5:
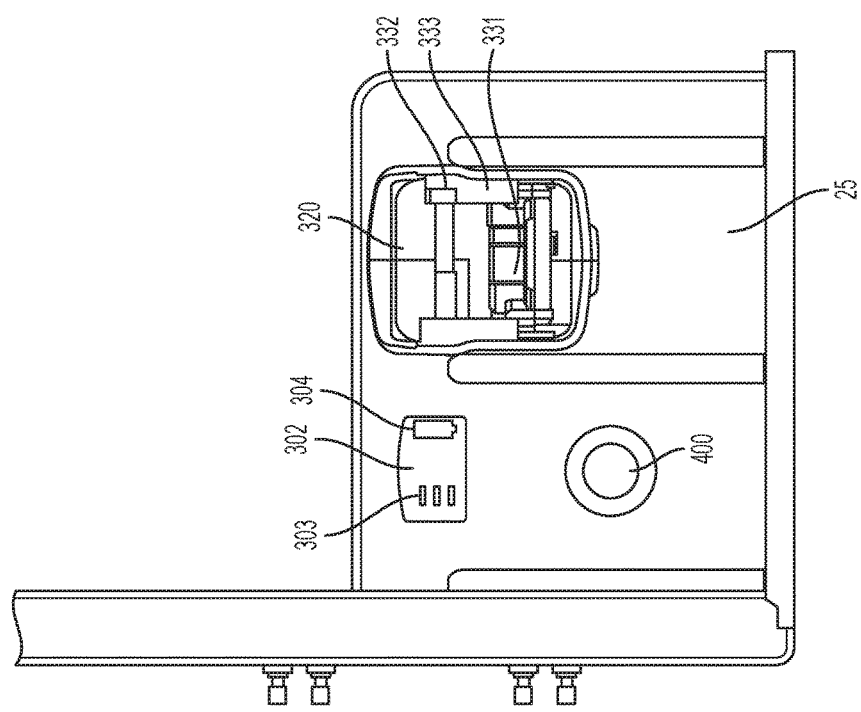
FIG. 5 is a side view of an exemplary embodiment of the scoreboard.
Figure 6:
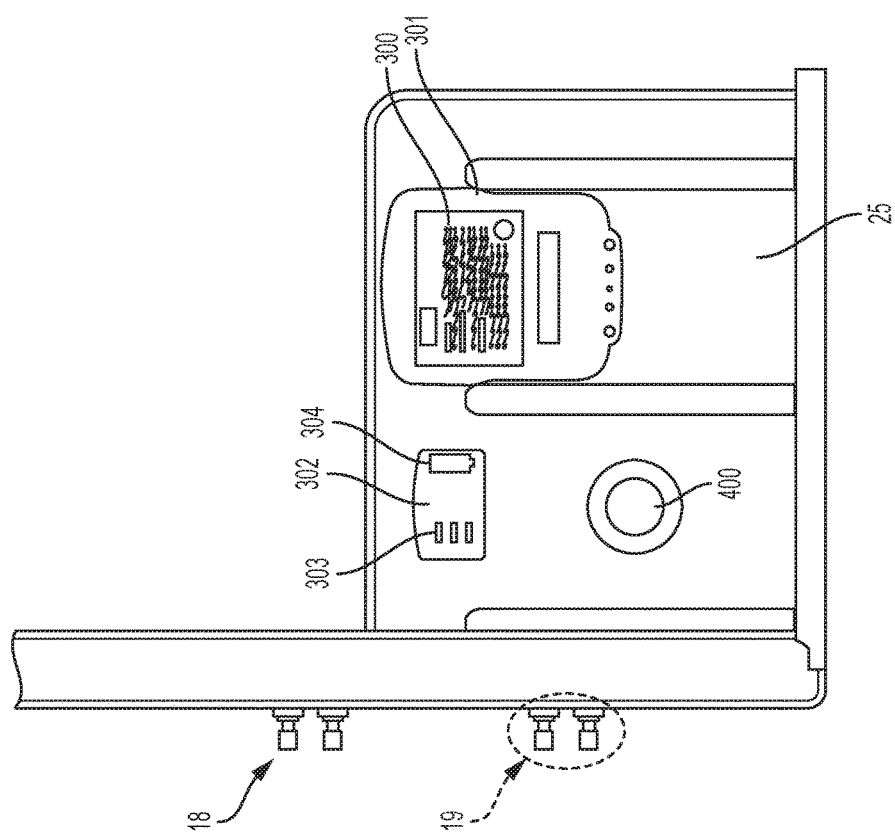
FIG. 6 is a side view of an exemplary embodiment of the scoreboard with a battery pack inserted.

FIGS. 5 and 6 illustrate a side of the scoreboard 10 with the battery pack receptacle 301. FIG. 5 illustrates the scoreboard 10 without the battery pack 300 and FIG. 6 illustrates the scoreboard 10 with the battery pack 300 inserted. As shown in FIGS. 5 and 6, the scoreboard 10 includes a state of charge indicator 302 with a three segment display 303 and a button 304. The state of charge indicator displays a state of charge of the battery when the battery pack 300 is inserted into the battery pack receptacle 301. In one embodiment, the indicator 302 may continuously display the state of charge. In other embodiments, the indicator 302 may display it upon insertion of the battery pack 300 or may be activated by depressing the button 304. The scoreboard 10 also includes a wireless pairing button 400. The wireless pairing button 400 can be depressed to start a pairing sequence with a remote host computing device 700, which will be described in further detail below.

Figure 7:
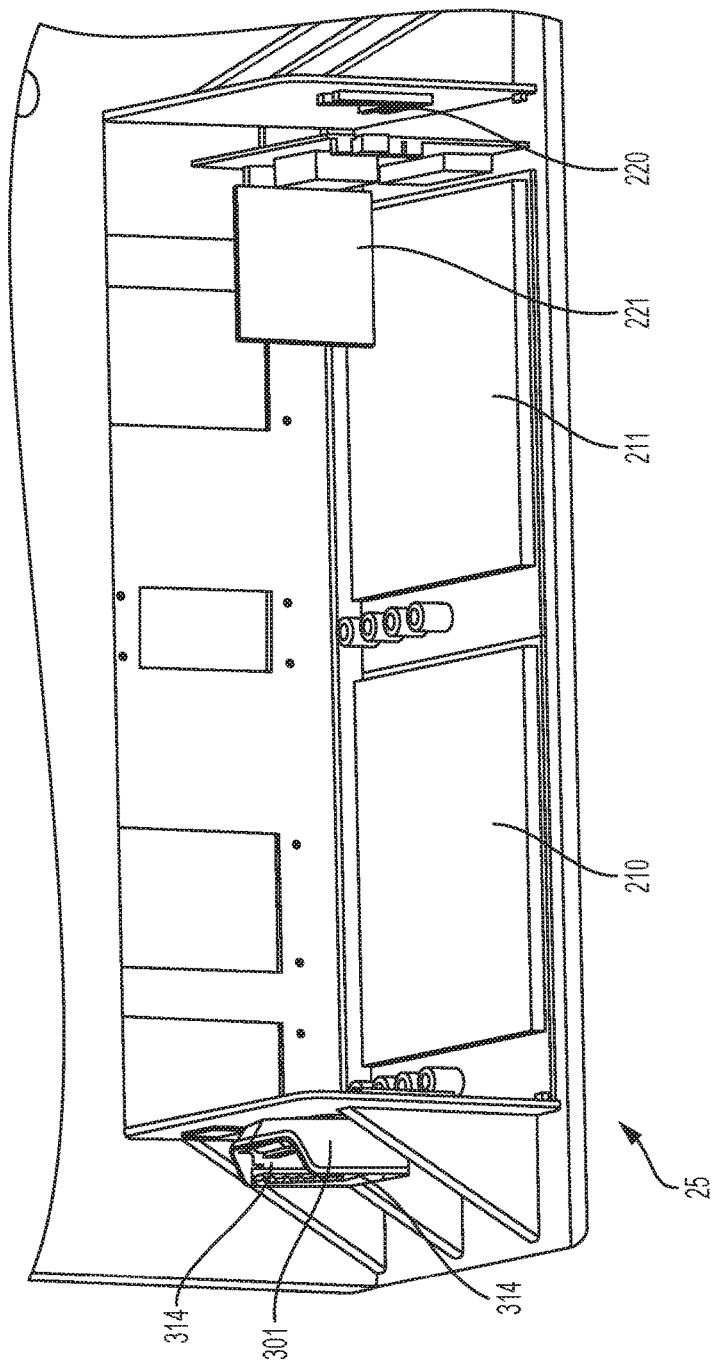
FIG. 7 is a rear perspective view of a bottom section of an exemplary embodiment of the scoreboard.

FIG. 7 illustrates a rear of the scoreboard 10. As shown in FIG. 7, a number of components are attached to the base 25. Particularly, the base 25 includes a pair of bread boards 210 and 211. A pair of circuit boards 220, 221 are also disposed on the base 25. The circuit boards support electrical components, as is known in the art. The electrical components may include components such as a microcontroller, microprocessor, memory, wireless transmitter, wireless receiver and the like. The electrical components are configured to control the function of the scoreboard 10. The section of the base 25 housing the breadboards 210 and 211 and circuit boards 220 and 221 can be covered by a cover (not shown). The cover may be water proof or water resistant so that the electrical components are not damaged by rain or other elements. In order to make the cover water resistant, the cover may be made of a material such as plastic or other material that is not water permeable. Additionally, the cover and/or the corresponding parts of the base which the cover contacts may include a gasket, for example a rubber of foam gasket. The battery pack receptacle 301 may be covered by the same or a separate cover which may also provide a water proof or water resistant seal. Again, the cover may be made of a material such as plastic or other material that is not water permeable and may include a gasket, such as a rubber of foam gasket.

Figure 8:
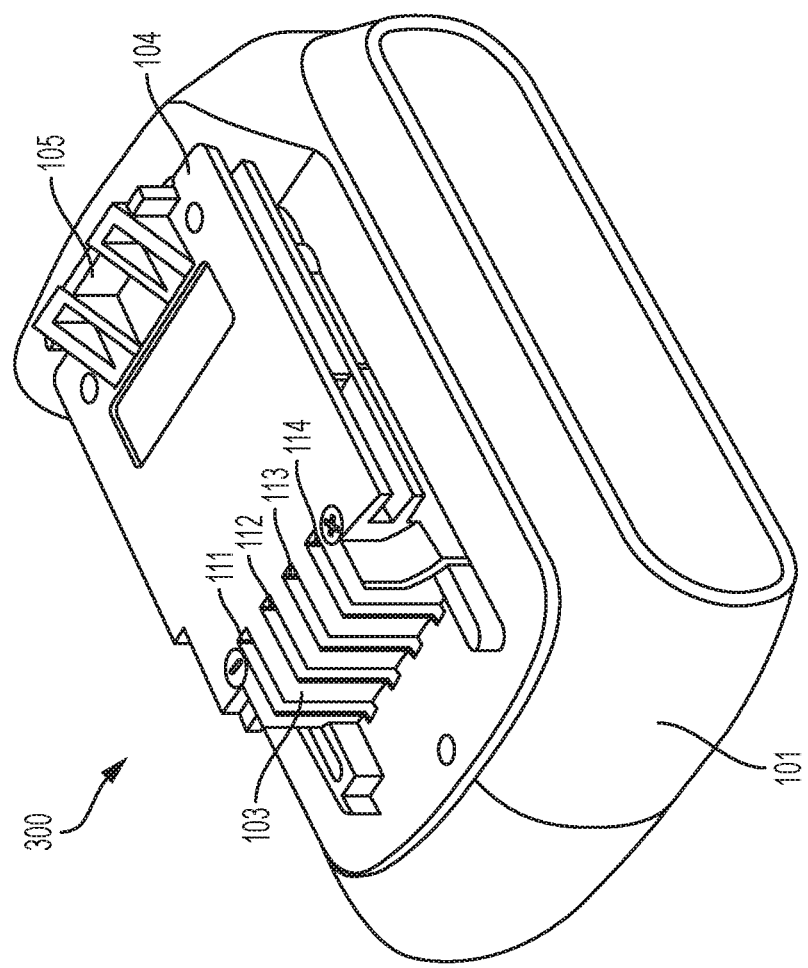
FIG. 8 is a perspective view of an exemplary embodiment of a battery pack.
Figure 9:
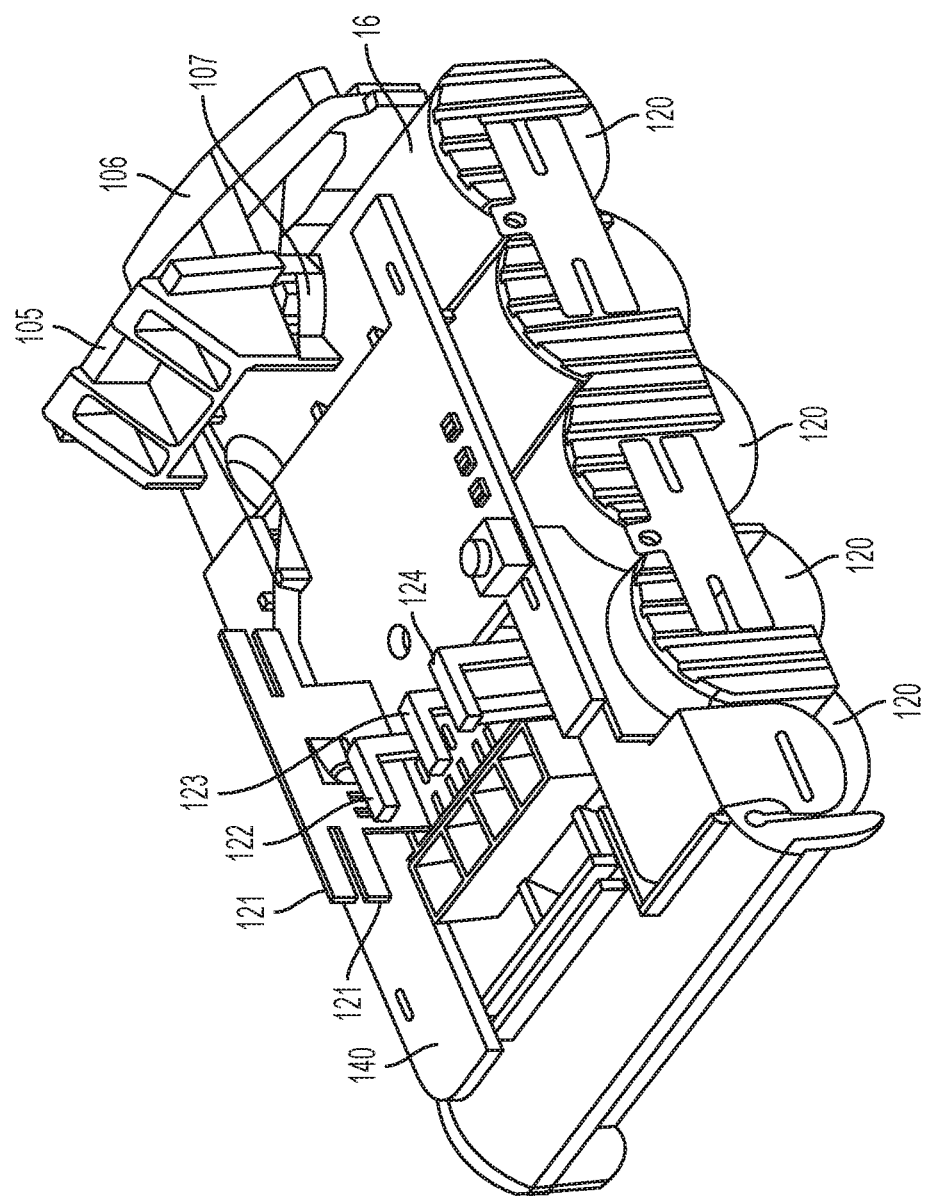
FIG. 9 is a perspective view of an inside an exemplary embodiment of the battery pack.

The battery pack 300 for powering the scoreboard 10 is shown in further detail in FIGS. 8 and 9. FIG. 8 is a perspective view of the pack and FIG. 9 has the housing removed to show the internals of the battery pack 300.

The battery pack 300 includes a set of rechargeable battery cells 120 disposed in a housing 101. The housing 101 includes guide rails 104 for connecting with the battery pack receptacle 301 and a latch 105 for securing the battery pack 300 in the receptacle 301. The latch 105 is biased upwardly by a spring 107 and the latch 105 can be moved by depression of the latch actuator 106, which may be integral with the latch 105. A battery pack with guide rails such as those shown these figures is more fully shown and described in U.S. Pat. No. 6,729,413, which is incorporated herein by reference in its entirety. The battery pack 300 also includes a connection section 103 through which the battery pack 300 can make connection with the scoreboard 10. The connection section includes four openings 111, 112, 113 and 114.

FIG. 9 is an illustrative drawing showing an inside of the battery pack 100 with the housing 101 removed. As shown, the pack includes a plurality of rechargeable battery cells 120. A cradle 16 sits over the battery cells 120 and a printed circuit board (PCB) 140 is connected to the cradle 16. The PCB 140 is in electrical connection with the battery cells 120. Electric connectors 121, 122, 123 and 124 are mounted on the PCB 140 and connect with power tools through the connection section 103, specifically openings 111, 112, 113 and 114 shown in FIG. 8. The electrical connecters serve as terminals for the battery pack. Connector 121 may serve as a negative terminal; connector 122 may be a temperature terminal which relays information related to a temperature of the battery pack; connector 123 may be an ID terminal which relays information related to identifying the pack and connector 124 may be a positive terminal.

The battery pack 300 connects with the scoreboard 10 at the battery pack receptacle 301. The battery pack receptacle 301 includes a pair or rails 314 with grooves defined behind the rails 314. The rails 104 of the battery pack 300 can slide into the receptacle 301 along the rails 314 in the groove. The latch 105 can fit in a depression 320 in the battery pack receptacle 301 in order to secure the battery pack 300. A user can retract the latch 105 by depressing the latch actuator 106, as discussed above, thereby allowing the battery pack 300 to be removed.

The battery pack receptacle 301 also include three electrical connectors 331, 332 and 333. The electrical connectors 331, 332 and 333 connect with the positive, negative and temperature terminals 121, 124 and 122 of the battery pack 300. The ID terminal 123 of the battery pack 300 is used when charging the battery pack 300. The battery pack 300 may be charged by a separate battery pack charger (not shown).

In other embodiment, the scoreboard 10 could also include a power cord and related electrical components so that the scoreboard 10 could be powered by AC power through an outlet as an alternative to using the battery pack 300. In that instance, the battery pack receptacle 301 could include an electrical connector to mate with the ID terminal 123 of the battery pack and the battery pack could also be charged through the battery pack receptacle.

Figure 13:
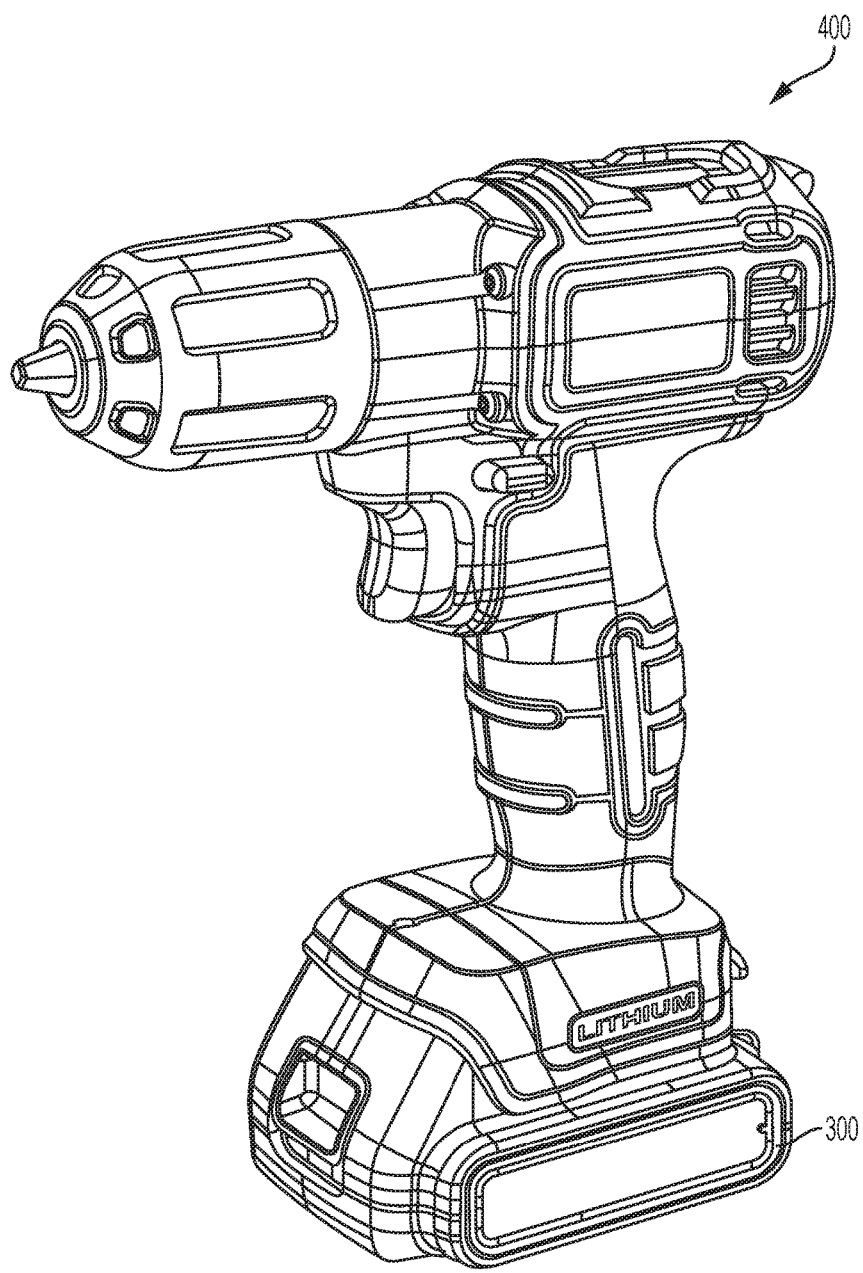
FIG. 13 is a perspective view of a power tool with a battery pack according to an exemplary embodiment.

Another feature of the scoreboard 10 is that the battery pack 300 can be used in a system with other products. For example, as shown in FIG. 13, the battery pack 300 may be used to power a drill 400. The drill 400 would have a battery pack receptacle section similar to the battery pack receptacle 301 described above. Accordingly, according to an exemplary embodiment, there is a system with a battery pack 300 a scoreboard 10 and a drill 400, where the battery pack 300 powers both the scoreboard 10 and the drill 400. Other power tools could additionally be included in the system and compatible with battery pack 300. For example, in addition to a drill 400 which is compatible with battery pack 300, the system may include a saw, sander, inflator, hedge trimmer, string trimmer or other power tools or outdoor power tools. Additional shapes for the battery pack are possible.

Figure 10:
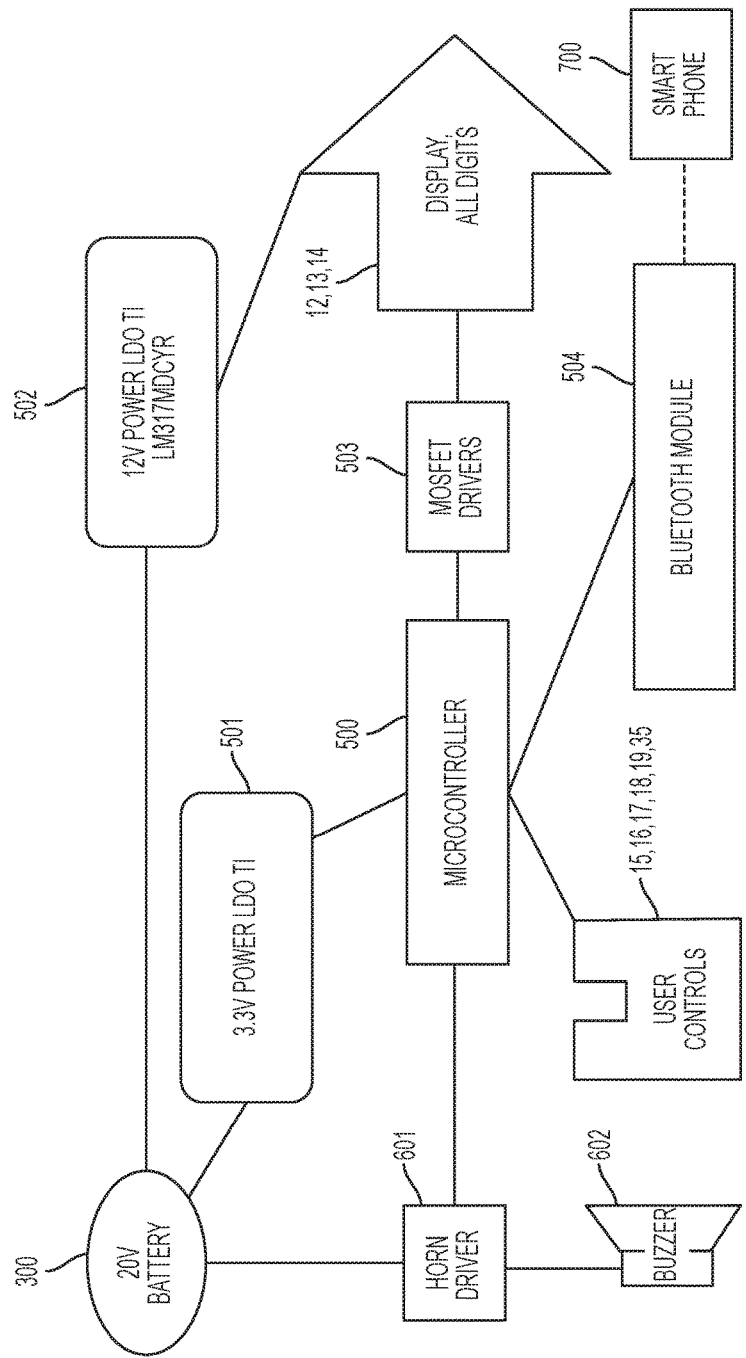
FIG. 10 is a schematic diagram of the scoreboard and battery pack.
Figure 11:
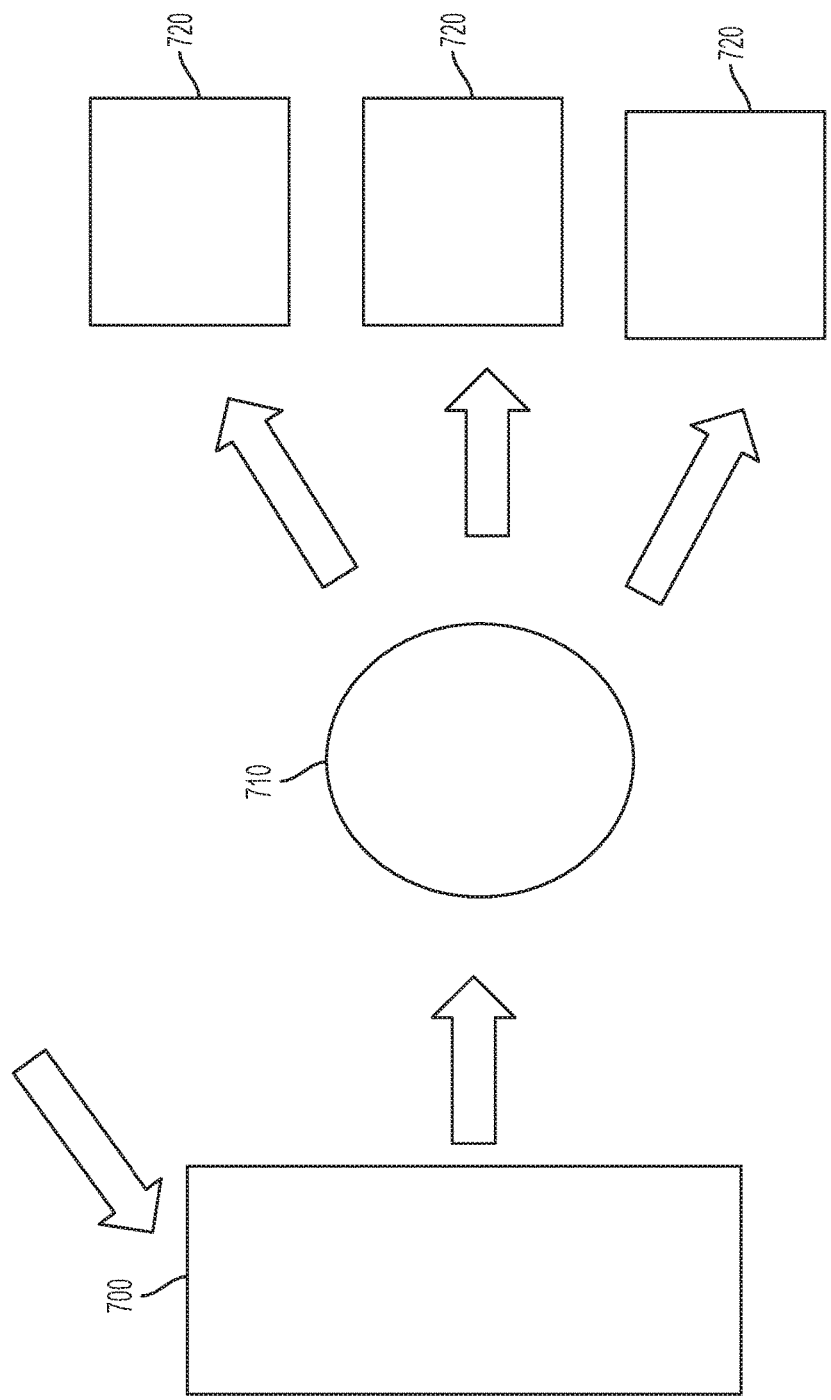
FIG. 11 is a schematic diagram of the wireless transmittal of information to client computing devices.

FIGS. 10 and 11 are schematic diagrams of the scoreboard system. In addition to the user controls 16, 17, 18, 19 and 35 integrated with the scoreboard 10, the scoreboard 10 may also be controlled by and communicate with a separate host computing device, such as a smart phone, tablet or personal computer. In the exemplary embodiment of the present application, the host computing device is a smart phone 700.

As shown in FIGS. 10 and 11, the battery pack 300 of the exemplary embodiment of the invention provides a 20V power source (providing a 20 volt nominal voltage). The 20V power source directly powers a horn driver 601 which can selectively sound a horn 602. This can be sounded at the end of a period, for example. As shown in FIG. 10, there are also a pair of low drop out regulators 501 and 502. The low drop out (LDO) regulator 501 converts the 20V power source provided by battery pack 300 into a suitable voltage for powering a microcontroller 500. The LDO regulator 502 converts the 20V to a suitable voltage for powering the displays 12, 13, 14 on the front face 11 of the scoreboard 10.

As shown, the microcontroller 500 is operably connected to a number of components. The microcontroller 500 can receive input from the user controls 15, 16, 17, 18, 19, 35. The microcontroller is connected to MOSFET drivers 503 which it can control to drive the displays 12, 13, 14. Additionally, the microcontroller 500 is connected to the horn driver 601 so that it can control operation of the buzzer 602. In this manner, a user can enter inputs on the user controls 15, 16, 17, 18, 19, 35, and those inputs can be used by the microcontroller to control the scoreboard.

The microcontroller 500 and MOSFET drivers 503 can drive the LEDs 51 of the displays 12, 13, 14 to be an continuously or almost continuously. If the LEDs 51 are on continuously or almost continuously, that can prevent flickering in pictures or video of the scoreboard. In contrast, if the LEDs 51 are quickly turned off and on, video will show a flickering display. Continuous display simply means that the LEDs 51 that are turned on the displays 12, 13, 14 are simply constantly powered so that there is no off-time to show up as a flicker in video. Almost continuous display allows for some toggling of the LEDs 51 in a manner that does not produce noticeable flickering on a typical video. Almost continuous display can be achieved by a very high duty cycle or a very long period such that the off times for the LEDs are far apart.

In some exemplary embodiments, the duty cycle of the LEDs 51 may be 90% or more; 95% or more; or 99% or more. In other exemplary embodiments, the LEDs 51 may be continuously on for more than 1 second at a time, more than 2 seconds at a time; more than 3 seconds at a time or more than 5 seconds at a time. That is, the LEDs may be lit continuously, without an off or low period, for periods of a least 1, 2, 3 or 5 seconds.

The microcontroller 500 is additionally connected to a wireless receiver/transmitter 504. In the exemplary embodiment, the wireless receiver/transmitter 504 is a Bluetooth module designed to communicate according to the Bluetooth protocols and the wireless receiver and the wireless transmitter are part of the same component. In other embodiments, they may be separate components. Also, other wireless protocols could be used instead, such as Zigbee or Wi-Fi.

The wireless receiver/transmitter 504 can communicate with a host computing device 700. The host computing device 700 can be, for example, a smart phone, tablet or personal computer. The host computing device 700 is separate from the scoreboard 10 and can be used as an alternate or additional means of control for the scoreboard 10. That is, the host computing device 700 can be used instead of or in addition to the user controls located on the scoreboard 10 to operate the scoreboard 10.

The scoreboard 10 can include modes where it is operated only by the user controls, only by the host computing device 700 or concurrently by the user controls and the host computing device 700. The microcontroller 500 can be programmed to operate according to the different modes. For example, when in a mode to be operated only by the user controls, the microcontroller 500 can ignore any control signals from the host computing device 700. When in the mode to be operated only by the host computing device 700, microcontroller 500 can ignore any control signals from the user controls. In the concurrent mode, the microcontroller 500 accepts control signals from both the host computing device 700 and the user controls. In various other modes, the microcontroller 500 may prioritize control signals from either the host computing device 700 or the user controls or accepts only some inputs from either the control signals or the host computing device 700. For example, the host computing device 700 could be operable to control the clock (upper row 31), but not the scores (32, 33).

Figure 12:
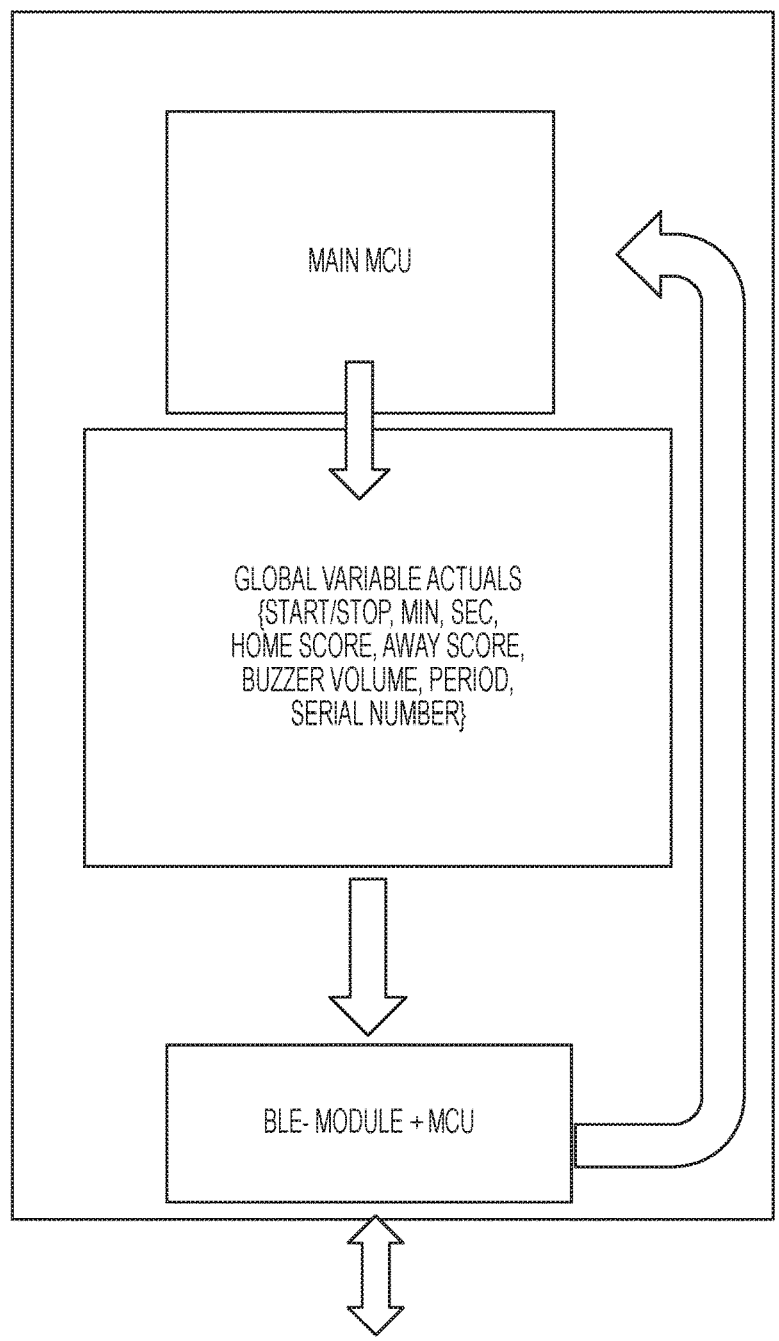
FIG. 12 is a schematic showing updating of score display information in the scoreboard.

As shown in FIG. 12, the microcontroller 500 may be periodically and continuously updated. As shown in FIG. 12, the microcontroller 500 checks a number of variables related to the display. These include the time, scores, period, and buzzer. It then sends any updates the wireless control module 504 and repeats the process. The wireless control module 504 sends any updates to the host computing device 700.

The host computing device 700 can include other functionalities in addition to controlling the scoreboard 10. Firstly, the host computing device 700 can itself display the score, time, period and any other information from the scoreboard on the host computing device's own screen. Additionally, the host computing device 700 can upload scores form the scoreboard 10 to the cloud 710 so that client computing devices 720 can view scores from the scoreboard 10. In this way, not only can spectators present at the site of the sporting event with the scoreboard 10 view the information of the scoreboard, but interested parties elsewhere can view the information on a client computing device 720 at a remote location. Only the host computing device 700 is paired to the scoreboard 10 via wireless communication.

In this manner, a number of different spectators may view the information from the scoreboard 10. First, spectators at the location of the scoreboard 10 are able to visually see the scoreboard 10 and the information displayed thereon. Additionally, the user of the host computing device 700 may view information from the scoreboard on the host computing device 700. As discussed above, the host computing device 700 may upload the information from the scoreboard to the cloud 710 and client computing devices 720 may access the information from the cloud 710 so that the client computing devices 720 display information from the scoreboard 10. The client computing devices 720 may display all of the information shown on the scoreboard 10 or different information and may display it in any variety of graphical formats.

In other exemplary embodiments, one or more of the microcontroller 500, circuit boards 220, 221, MOSFET drivers 503, wireless transmitter/receiver module 504, low drop out regulator 501 or other electronic components may be located on a rear side of one or more of the displays 12. These electronic components may be located inside the outer boundary defined by the LEDs 51 of a display 12. Incorporating these electronic components on the LED display 12 may save space or cost.

The scoreboard 10 of the exemplary embodiment is a dedicated scoreboard that is particularly designed to be used as a scoreboard. A dedicated scoreboard can be advantageous in the system of the present application. For example, it can be designed to be cost-effective, lightweight and portable. It can also be designed at a size that allows the display to be properly seen by spectators. At the same time, the scoreboard system of the present application allows for remote access of scores through client computing devices.

The description of the invention is merely exemplary in nature and, thus, variations that do not depart from the gist of the invention are intended to be within the scope of the invention. Such variations are not to be regarded as a departure from the scope of the invention.

What is claimed is:
1. A scoreboard system, the system comprising:
a scoreboard, the scoreboard configured to display display information including at least one score, the scoreboard including a first wireless receiver and a first wireless transmitter;
a battery pack which is removably coupled to the scoreboard and selectively powers the scoreboard;
wherein the battery pack comprises a housing and at least one battery cell housed in the housing;
further comprising a host computing device separate from the scoreboard, the host computing device including a second wireless transmitter and a second wireless receiver, the host computing device being wirelessly paired with the scoreboard so that the host computing device receives data related to the display information; and at least one client computing device, the client computing device including a third wireless receiver;

wherein the host computing device is configured to wirelessly transmit data related to the display information to a cloud, whereby the display information displayed on the scoreboard can be retrieved by users of the at least one client computing device;

wherein the scoreboard further comprises a battery pack receptacle, the battery pack receptacle including a pair of receptacle rails and a pair of receptacle grooves;

wherein the scoreboard also further comprises a plurality of physical controls configured to operate the scoreboard;

wherein the battery pack further comprises a pair of rails which engage the receptacle grooves;

wherein the battery pack receptacle further comprises a plurality of electrical connectors;

wherein the scoreboard further includes a front face including a plurality of numerical LED displays configured to display digits from zero through nine; and wherein the battery pack is configured to selectively couple to and provide power to a drill.

2. The scoreboard system of claim 1, wherein the battery pack further includes a circuit board.

3. The scoreboard system of claim 2, wherein the battery pack further includes a positive terminal, a negative terminal and a temperature terminal.

4. The scoreboard system of claim 3, wherein the positive terminal the negative terminal and the temperature terminal are operatively connected with the circuit board.

5. The scoreboard system of claim 1, wherein the battery pack further includes a controller; and wherein the controller monitors a temperature and voltage of the battery pack.

6. The scoreboard system of claim 3, wherein the battery pack further includes an ID terminal.

7. The scoreboard system of claim 1, wherein a plurality of battery cells are housed in the housing.

8. The scoreboard system of claim 1, wherein the scoreboard is configured to display at least two scores.

9. The scoreboard system of claim 1, wherein the scoreboard is configured to display a clock.

10. A scoreboard system, the system comprising:

a scoreboard, the scoreboard configured to display display information including at least one score and a clock, the scoreboard including a first wireless receiver and a first wireless transmitter;

a host computing device separate from the scoreboard, the computing device including a second wireless transmitter and a second wireless receiver and operable to communicate with the scoreboard through the first wireless receiver and first wireless transmitter so that the computing device receives data related to the display information;

wherein the scoreboard includes user controls on the scoreboard, the user controls configured to control display of the at least one score and the clock; and at least one client computing device, the client computing device including a third wireless receiver;

wherein the host computing device is configured to wirelessly transmit data related to the display information to a cloud, whereby the display information displayed on the scoreboard can be retrieved by users of the at least one client computing device;

wherein the scoreboard further comprises a battery pack receptacle, the battery pack receptacle including a pair of receptacle rails and a pair of receptacle grooves;

wherein the scoreboard also further comprises a plurality of physical controls configured to operate the scoreboard;

wherein the battery pack further comprises a pair of rails which engage the receptacle grooves;

wherein the battery pack receptacle further comprises a plurality of electrical connectors;

wherein the scoreboard further includes a front face including a plurality of numerical LED displays configured to display digits from zero through nine; and wherein the battery pack is configured to selectively couple to and provide power to a drill.

11. The scoreboard system of claim 10, wherein the host computing device is also operable to control display of the at least one score and the clock.

12. The scoreboard system of claim 11, wherein the scoreboard includes a controller which determines how the display of the at least one score and the clock is controlled when signals are received from both the host computing device and the user controls.

13. The scoreboard system of claim 10, wherein the scoreboard includes a controller; and wherein the scoreboard can be operated in a mode where inputs from the user controls are ignored.

14. The scoreboard system of claim 11, wherein the scoreboard includes a controller; and wherein the scoreboard can be operated in a mode where inputs from the host computing device are ignored.

15. The scoreboard system of claim 10, wherein the host computing device is configured to wirelessly transmit information related to information displayed on the scoreboard to a cloud whereby information displayed on the scoreboard can be retrieved by users of client computing devices.

16. A scoreboard system, the system comprising:

a scoreboard, the scoreboard configured to display display information including at least one score and a clock, the scoreboard including a first wireless receiver and a first wireless transmitter;

a battery pack, the battery pack comprising a housing, a plurality of battery cells housed in the housing and a circuit board housed in the housing; and wherein the battery pack is a rechargeable battery pack and is removably coupleable to the scoreboard to power the scoreboard and is removably coupleable to a power tool to power the power tool;

further comprising a host computing device separate from the scoreboard, the host computing device including a second wireless transmitter and a second wireless receiver, the host computing device being wirelessly paired with the scoreboard so that the host computing device receives data related to the display information; and at least one client computing device, the client computing device including a third wireless receiver;

wherein the host computing device is configured to wirelessly transmit data related to the display information to a cloud, whereby the display information displayed on the scoreboard can be retrieved by users of the at least one client computing device;

wherein the scoreboard further comprises a battery pack receptacle, the battery pack receptacle including a pair of receptacle rails and a pair of receptacle grooves;

wherein the scoreboard also further comprises a plurality of physical controls configured to operate the scoreboard;

wherein the battery pack further comprises a pair of rails which engage the receptacle grooves;

wherein the battery pack receptacle further comprises a plurality of electrical connectors; and wherein the scoreboard further includes a front face including a plurality of numerical LED displays configured to display digits from zero through nine.

17. The scoreboard system of claim 16, wherein the battery pack further includes a positive terminal, a negative terminal and a temperature terminal.

18. The scoreboard system of claim 16, wherein the power tool is a drill.

19. A scoreboard system, the system comprising:
a scoreboard, the scoreboard including:
   a front face with a plurality of LED displays, each of the plurality of LED displays configured to display digits from zero through nine;
   a plurality of physical controls configured to operate the scoreboard; and
   a battery pack receptacle, the battery pack receptacle including a pair of receiving grooves and a plurality of receptacle electrical connectors;
a battery pack which is removably coupled to the scoreboard and selectively powers the scoreboard, the battery pack including:
   a housing;
   at least one battery cell housed in the housing;
   a pair of rails, the rails configured to be engaged with the pair of receiving grooves of the battery pack receptacle;
   a plurality of battery pack electrical connectors which engage the receptacle electrical connectors; and
a drill, the drill configured to receive and be powered by the battery pack.

* * * * *